United States Patent
Carbajales et al.

(10) Patent No.: US 10,535,032 B2
(45) Date of Patent: Jan. 14, 2020

(54) PROCESS MODEL MERGING

(75) Inventors: Sebastian Carbajales, Toronto (CA);
Tak S. Chau, Markham (CA);
Christian Gerth, Paderborn (DE);
Michael Illiger, Haiterbach (DE);
Jochen M. Kuester, Zurich (CH);
Simon Moser, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 458 days.

(21) Appl. No.: 13/443,063

(22) Filed: Apr. 10, 2012

(65) Prior Publication Data

US 2012/0265507 A1    Oct. 18, 2012

(30) Foreign Application Priority Data

Apr. 15, 2011 (EP) .................................. 11162673

(51) Int. Cl.
*G06Q 10/06* (2012.01)
*G06F 8/35* (2018.01)
*G06F 8/71* (2018.01)

(52) U.S. Cl.
CPC ............. *G06Q 10/067* (2013.01); *G06F 8/35* (2013.01); *G06F 8/71* (2013.01)

(58) Field of Classification Search
CPC ............. G06Q 10/067; G06F 8/35; G06F 8/71
USPC ............................................................ 703/6
See application file for complete search history.

(56) References Cited

U.S. PATENT DOCUMENTS

| | | | | |
|---|---|---|---|---|
| 5,971,589 A | * | 10/1999 | Hazama | G05B 19/4097 700/145 |
| 6,678,882 B1 | * | 1/2004 | Hurley et al. | 717/121 |
| 7,222,302 B2 | * | 5/2007 | Hauser et al. | 715/734 |
| 7,434,202 B2 | * | 10/2008 | Kramer | G06F 8/71 717/102 |
| 7,694,272 B2 | * | 4/2010 | Bronicki et al. | 717/109 |
| 2006/0130008 A1 | * | 6/2006 | Nguyen et al. | 717/136 |
| 2006/0282458 A1 | | 6/2006 | Tsyganskiy et al. | |
| 2006/0253403 A1 | * | 11/2006 | Stacklin | G06Q 10/00 705/400 |

(Continued)

OTHER PUBLICATIONS

Bartelt, C. "Consistence Preserving Model Merge in Collaborative Development Processes," CVSM'08, May 17, 2008, Copyright 2008 ACM, 6 Pages.*

(Continued)

*Primary Examiner* — Dwin M Craig
(74) *Attorney, Agent, or Firm* — Cantor Colburn LLP; Anthony V England

(57) ABSTRACT

Process model merging receives data representative of a first model that models a first process and a second model that models a second process, and determines, based on the data and a predetermined plurality of basic model manipulation operations, atomic differences in the second model relative to the first model. Compound differences are determined in the second model relative to the first model. A user is informed of the atomic differences and the compound differences. The user is allowed to select a set of the plurality of basic model manipulation operations. A modified first model is obtained by applying the selected set of basic model manipulation operations to the first model.

20 Claims, 5 Drawing Sheets

(56) References Cited

U.S. PATENT DOCUMENTS

| | | | | |
|---|---|---|---|---|
| 2007/0283321 | A1* | 12/2007 | Hegde | G06F 8/71 717/110 |
| 2008/0005235 | A1* | 1/2008 | Hegde | H04L 67/24 709/204 |
| 2008/0255815 | A1* | 10/2008 | Facciorusso et al. | 703/6 |
| 2008/0263510 | A1* | 10/2008 | Nerome et al. | 717/104 |
| 2009/0113394 | A1* | 4/2009 | Weber et al. | 717/126 |
| 2009/0138249 | A1* | 5/2009 | Irassar et al. | 703/6 |
| 2009/0144119 | A1* | 6/2009 | Yamamoto et al. | 705/8 |
| 2009/0150860 | A1* | 6/2009 | Gschwind et al. | 717/104 |
| 2009/0187881 | A1 | 7/2009 | Feger et al. | |
| 2009/0187889 | A1* | 7/2009 | Kuester et al. | 717/125 |
| 2009/0281865 | A1* | 11/2009 | Stoitsev | 705/9 |
| 2010/0131421 | A1* | 5/2010 | Kuester | G06Q 10/06 705/348 |
| 2010/0145746 | A1 | 6/2010 | Gerth et al. | |
| 2011/0029983 | A1* | 2/2011 | Lu et al. | 718/105 |
| 2011/0071876 | A1* | 3/2011 | Fong et al. | 705/8 |
| 2012/0210294 | A1* | 8/2012 | Gores | G06F 8/71 717/105 |

OTHER PUBLICATIONS

Küster, Jochen M. "Definition and validation of model transformations." Software & Systems Modeling 5, No. 3, 2006, pp. 233-259.*
J. M. Küster, et al., "A Tool for Process Merging in Business-Driven Development." In CAISE Forum (Conference on Advanced Information Systems Engineering), vol. 344. 2008, pp. 95-98.*
T.H. Christensen, et al., "Ganesh—Holistic Version Control in a Structure Based Environment," Department of Computer Science—Institute of Electronic Systems, Aalborg University, 1998, 68 pages.*
H. Ehrig, et-al., "A Formal Resolution Strategy for Operation-Based Conflicts in Model Versioning Using Graph Modifications," 14th International Conference, FASE (Joint European Conference on Theory and Practice of Software, ETAPS 2011), Mar. 26-Apr. 3, 2011, pp. 202-216.*
Reiter T, Altmanninger K, Bergmayr A, Schwinger W, Kotsis G. Models in conflict-detection of semantic conflicts in model-based development. MDEIS@ ICEIS. Jun. 2007;2007:29-40.*
Mens T. A state-of-the-art survey on software merging. Software Engineering, IEEE Transactions on. May 2002;28(5):449-62.*
Küster JM, Gerth C, Engels G. Dependent and conflicting change operations of process models. InModel Driven Architecture-Foundations and Applications Jun. 23, 2009 (pp. 158-173). Springer Berlin Heidelberg.*
Küster JM, Gerth C, Engels G. Dynamic computation of change operations in version management of business process models. InModelling Foundations and Applications Jun. 15, 2010 (pp. 201-216). Springer Berlin Heidelberg.*
Sadiq, W. "Analyzing Process Models Using Graph Reduction Techniques," Information Systems vol. 25, No. 2, 2000, pp. 117-134.*
Sadiq, W., et al., "Applying Graph Reduction Techniques for Identifying Structural Conflicts in Process Models." In Advanced Information Systems Engineering, 1999, pp. 195-209.*
Weber, B., et al., "Change Patterns and Change Support Features—Enhancing Flexibility in Process-Aware Information Systems," Data and Knowledge Engineering, vol. 66, 2008, pp. 438-466.*
S. Moser, et al., Advanced Verification of Distributed WS-BPEL Business Processes Incorporating CSSA-based Data Flow Analysis, 2007 IEEE Int. Conf. on Services Computing, IEEE, Los Alamitos (2007), 8 pages.
J. Kuster, et al., Dependent and Conflicting Change Operations of Process Models, Proceedings of the 5th European Conference on Model-Driven Architecture Foundations and Applications (ECMDA-FA '09), Springer (Berlin/Heidelberg), LNCS, vol. 5562 pp. 158-173 (2009), 24 pages.
J. Kuster, et al., Detecting and Resolving Process Model Differences in the Absence of a Change Log, Proceedings of the 6th International Conference on Buisness Process Management (BPM'08), Springer (Berlin/Heidelberg), LNCS, vol. 5240, pp. 244-260, 2008, 16 pages.
J. Kuster, et al., Dynamic Computation of Change Operations in Version Management of Business Process Models, Accepted at 6th European Conference on Model-Driven Architecture Foundations and Applications (ECMFA '10) (2010), 19 pages.
EMF Compare Project, [online], [retrieved on Apr. 10, 2012], retrieved from the internet http://wiki.eclipse.org/index.php/EMF_Compare 04/, 3 pages.
T. Chau, et al., Preserving Soundness of Graph Flow When Merging Changes in Graph, IP.com Prior Art Database, Published as Article No. IPCOM000205115D, Mar. 15, 2011, 20 pages.

* cited by examiner

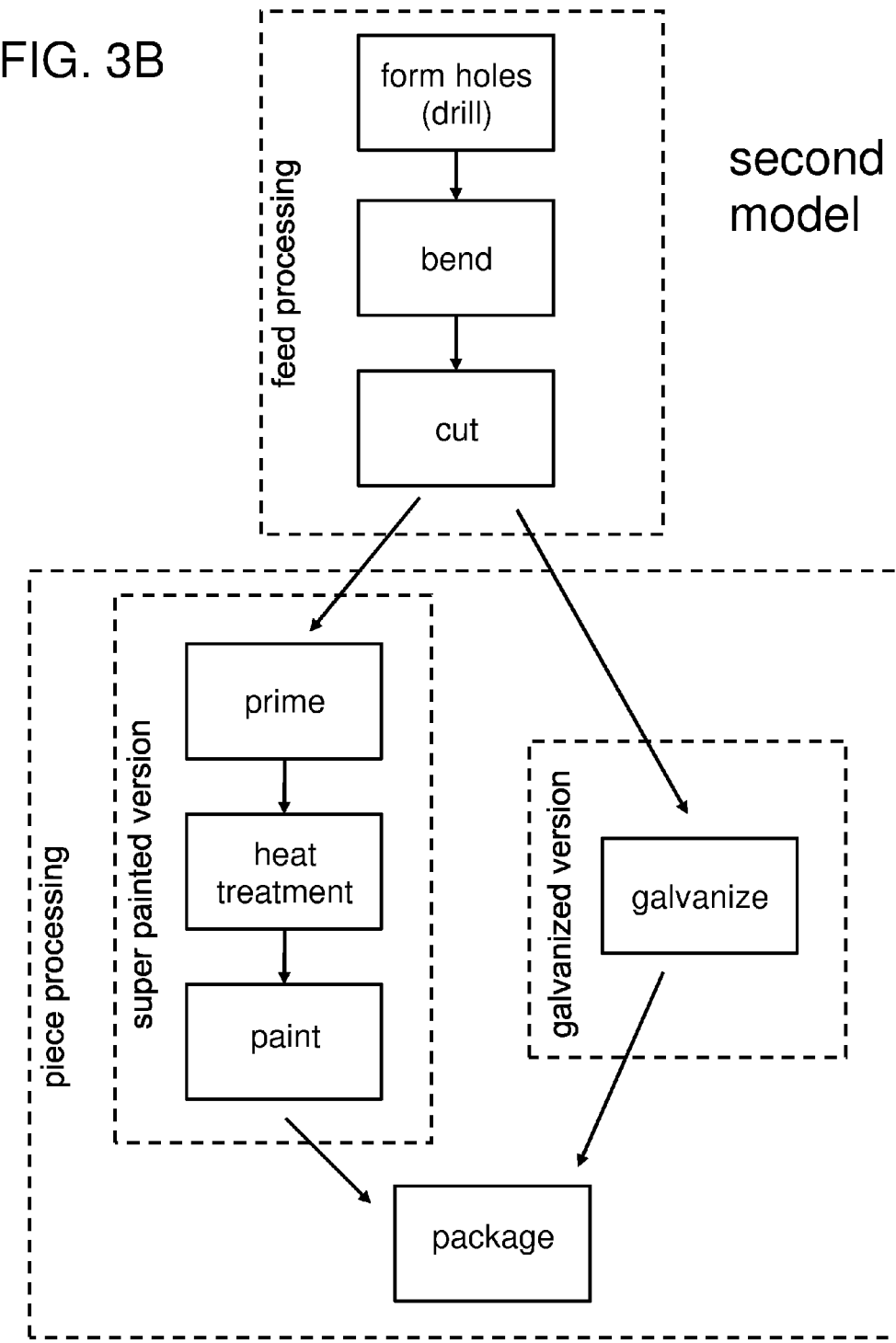

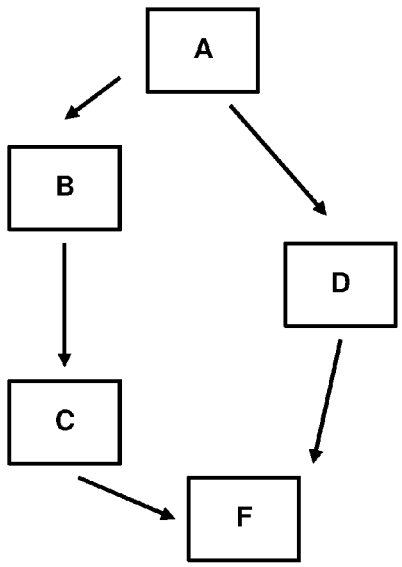
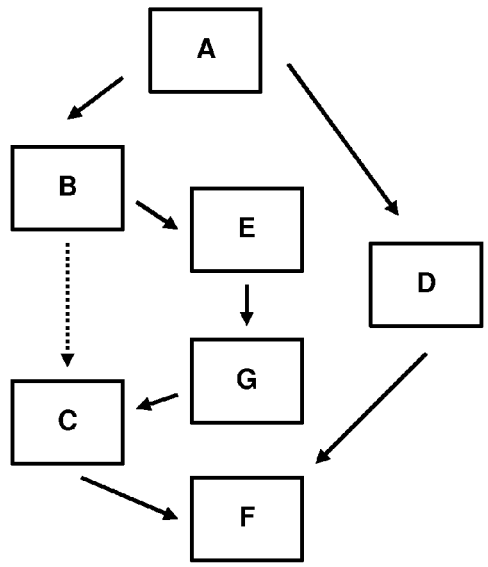
FIG. 5A
FIG. 5B
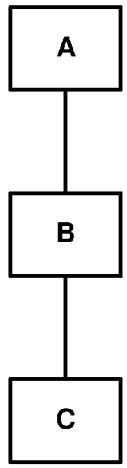
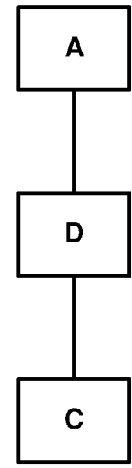
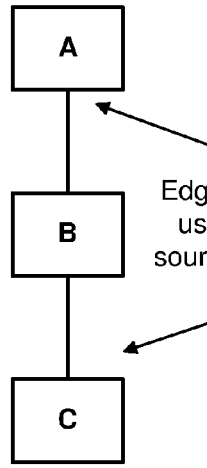
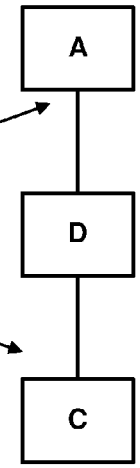
FIG. 6A   FIG. 6B   FIG. 6C

PROCESS MODEL MERGING

PRIORITY

The present application claims priority to European Patent Application No. 11162673.5, filed on 15 Apr. 2011, and all the benefits accruing therefrom under 35 U.S.C. § 119, the contents of which in its entirety are herein incorporated by reference.

BACKGROUND

The present invention relates to process model merging. More specifically, the present invention relates to generating a modified process model based on a selected set of model operations in view of atomic differences and compound differences between models.

A wide variety of tasks in nearly all fields of engineering, business and everyday life can be seen as processes. In the context of the present disclosure, the term "process" can be understood in its broadest sense. As used herein, the term "process" can be understood as a set of actions and decisions to be undertaken to achieve a desired result. For example, a vending machine may be equipped to accept coins and to make appropriate change depending on a purchase. As such, the vending machine may carry out a process involving actions such as deciding whether an inserted object is a coin, discarding non-coin objects via a change return opening, identifying the denomination of inserted coins and totaling their value, calculating an appropriate set of coins to be returned as change. As is evident from this example, the set of actions and decisions constituting a process may include sequenced actions and decisions, i.e., actions and decisions that must be carried out in a particular order. Similarly, the set of actions and decisions constituting a process may include actions and/or decisions that are carried out in parallel, i.e., at the same time. Moreover, actions and decisions within the set of actions and decisions constituting a process may be dependent on other actions and/or decisions within the set of actions and decisions constituting the process and/or dependent on external factors. In the above example, for instance, identifying the denomination need not be carried out if it has been determined that the inserted object is not a coin. Similarly, the actions and decisions associated with calculating an appropriate set of coins to be returned as change might not be carried out if the user does not press the "return change" button or if the user does not make a purchase.

Processes can be modeled a variety of ways, i.e., in accordance with any of a plurality of modeling schemes. For example, it is known to use a conventional graph having nodes and edges to model a process. Individual nodes of the graph can represent individual operations/decisions belonging to the process. Similarly, individual nodes of the graph can represent a set of operations/decisions belonging to the process. This is purely a matter of definition since what is to be considered a single action/decision or a set of actions/decisions is simply a question of the granularity of the model. As exemplified by the above example, getting into a car can be viewed as a single action or as a set of numerous actions and decisions. The individual edges can interconnect a respective pair of nodes and can thus represent dependencies between the operations/decisions associated with the respective, interconnected nodes. For example, a directed graph (i.e., a graph with "unidirectional" edges) can be used to represent sequencing (i.e., temporal dependency) within the process.

In cases where different processes are modeled using different modeling schemes (e.g., using schemes of differing granularity), a mapping may exist between the different modeling schemes. Such a mapping allows a process modeled with one of the different modeling schemes to be compared with or converted to another of the different modeling schemes, or vice-versa.

SUMMARY

According to exemplary embodiments, a method, system, and computer program product for process model merging are provided. The method includes receiving data representative of a first model that models a first process and a second model that models a second process, and determining, based on the data and a predetermined plurality of basic model manipulation operations, atomic differences in the second model relative to the first model. The method also includes determining compound differences in the second model relative to the first model. The method further includes informing a user of the atomic differences and the compound differences, and allowing the user to select a set of the plurality of basic model manipulation operations. The method additionally includes obtaining a modified first model by applying the selected set of basic model manipulation operations to the first model.

The system for merging process models includes a data receiving subsystem configured to receive data representative of a first model that models a first process and a second model that models a second process. The system further includes an atomic differences determining subsystem configured to determine, based on the data and a predetermined plurality of basic model manipulation operations, atomic differences in the second model relative to the first model. The system also includes a compound differences determining subsystem configured to determine compound differences in the second model relative to the first model. The system additionally includes a user interface configured to inform a user of the atomic differences and the compound differences, the user interface allowing the user to select a set of the plurality of basic model manipulation operations. The system further includes a model modification subsystem configured to obtain a modified first model by applying the selected set of basic model manipulation operations to the first model.

A computer program product for merging process models according to the method is also provided.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

FIG. 3B shows a second process model;

FIG. 5A shows a third process model;

FIG. 5B shows a modification of the third process model of FIG. 5A;

FIG. 6A shows a graph;

FIG. 6B shows an updated version of the graph of FIG. 6A; and

FIG. 6C shows operations on the graph of FIG. 6A.

DETAILED DESCRIPTION

Figure 1:
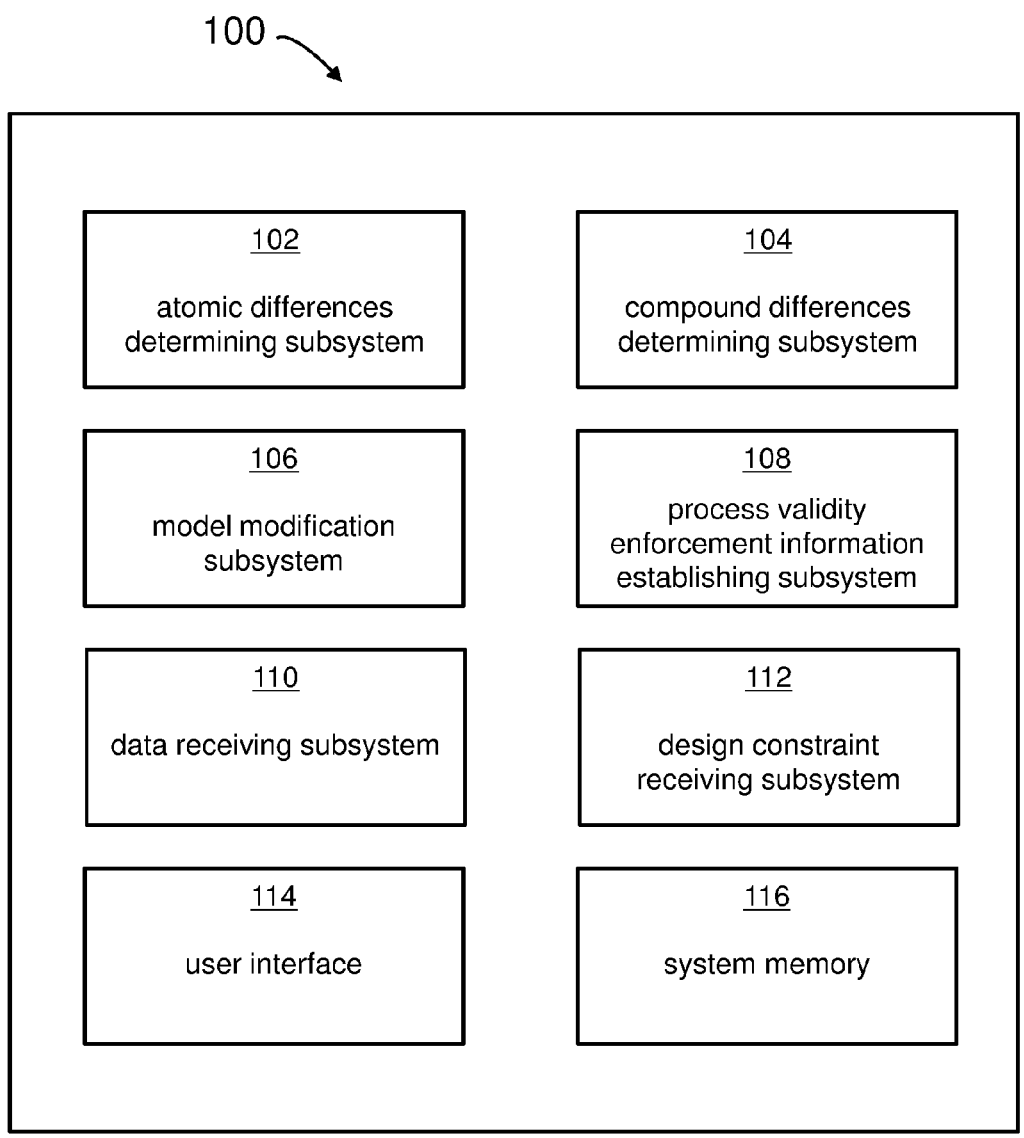
FIG. 1 shows a system for merging process models in accordance with an embodiment.

An embodiment of present invention is directed to a system for merging process models. In an embodiment, a first model and a second model are at least partially merged into a target model. The merging may be carried out via one or more intermediate blocks, each yielding a modified model (i.e., an intermediate target model).

Such a system may include an atomic differences determining subsystem that determines atomic differences in a second model relative to a first model and a compound differences determining subsystem that determines compound differences in the second model relative to the first model. The atomic differences determining subsystem and the compound differences determining subsystem may be configured to categorize differences in the second model relative to the first model as compound differences rather than atomic differences wherever possible. The atomic differences determining subsystem and the compound differences determining subsystem may be configured to determine the atomic/compound differences such that the determined atomic differences and the determined compound differences are mutually exclusive and that the determined compound differences are non-overlapping. In other words, the sum of the first model, the determined atomic differences and the determined compound differences correspond to the second model.

Atomic differences may be understood as a smallest unit of difference in a reference modeling scheme, e.g., a difference that can be brought about by a single basic model manipulation operation in the reference modeling scheme. Accordingly, atomic differences may be termed "atomic operations." Compound differences may be understood as differences that involve at least two atomic differences in the reference modeling scheme. Accordingly, compound differences may be termed "compound operations." Additionally, compound differences may be understood as a set of atomic differences that are perceivable as constituting a single atomic difference at a courser level of granularity. In other words, a compound difference may be a set of atomic differences that are logically and/or physically associated in the respective model.

Stated yet again in different words, a compound difference may be a set of atomic differences each of which can be paired with at least one other atomic difference of the set of atomic differences, the paired atomic differences both relating to a respective common parameter/variable or element of the model. For instance, in the case of a graph having a node A, a node B and an edge AB, a compound difference could include the atomic differences: i) disconnectedge AB from node B, ii) delete node B, iii) disconnect edge AB from node A and iv) delete edge AB. Atomic difference i) is related to ii) via common node B, and vice versa. Atomic difference iii) is related to i) via common edge AB. Atomic difference iv) is related to iii) via common edge AB. Thus, each of the atomic differences belonging to the set can be paired with at least one other atomic difference belonging to the set via a respective common element of the model. At a coarser level of granularity, this compound difference could be viewed as an atomic difference, namely "removal of the branch consisting of edge AB and node B."

Compound differences may moreover be understood as excluding atomic differences that impact only one element of the model. In the above example, for instance, the compound difference "removal of the branch consisting of edge AB and node B" could be accompanied by an atomic difference v) that simply modifies a parameter of a single node, e.g., modification of node A to node A'. However, despite that fact that atomic difference v), like atomic difference iii), relates to node A, atomic difference v) could be deemed as not constituting part of the compound difference because atomic difference v) does not impact neighboring elements of the model.

The reference modeling scheme may be the modeling scheme underlying the first model, the second model or a target model that is obtained by at least partial merging of the first and second models. The modeling scheme underlying the first model can, but need not be identical to the modeling scheme underlying the second model. The modeling scheme underlying the target model can, but need not be identical to the modeling scheme underlying the first/second model.

A modeling scheme may be associated with a set of basic model manipulation operations. Each basic model manipulation operation effects a change that may be designated as a smallest unit of difference, i.e., as an atomic difference, in the respective modeling scheme. Accordingly, the aforementioned determination of atomic differences in the second model relative to the first model may be based on a predetermined plurality of basic model manipulation operations, e.g., on a set of basic model manipulation operations associated with the reference modeling scheme.

The system for merging process models may moreover include a user interface. The user interface may inform a user of the atomic differences and the compound differences. For example, the user interface may present a graphical representation of the first model in a first layer, present a graphical representation of the atomic differences in second layer, and present a graphical representation of the compound differences in third layer. The layers could be presented individually or as overlays. Similarly, the user interface may present a graphical representation of the first model in a first color, present a graphical representation of the atomic differences in second color, and present a graphical representation of the compound differences in third color. In the above exemplary embodiments, the combination of the three representations would present a graphical representation of the second model. Presenting compound differences in a manner distinct from atomic differences reduces clutter and makes the presentation easier for the user to understand.

The user interface may allow a user to select a set of basic model manipulation operations from a set of basic model manipulation operations associated with the reference modeling scheme. Noting that, by virtue of the above definitions, the determined atomic differences/the determined compound differences can be mapped in a one-to-one fashion to a set of basic model manipulation operations, the user interface may allow the user to select the set of basic model manipulation operations via selection of one or more of the determined atomic differences/the determined compound differences. The user interface may moreover allow a user to add or remove basic model manipulation operations from a set of basic model manipulation operations obtained via selection of one or more of the determined atomic differences/the determined compound differences. The user interface may allow a user to break up a compound difference into a set of individual atomic differences and to select a set of basic model manipulation operations via selection from the set of individual atomic differences. In this manner, the user can not only quickly select manipulation operations based on difference between the two models, but also "manually" tweak the selected set of manipulation operations as necessary.

The system for merging process models may moreover include a model modification subsystem that obtains a modified model, i.e., the aforementioned target model, by applying the user-selected set of basic model manipulation operations to a model, e.g., the first model. For example, the system may ascertain the atomic and compound differences between the first and second models as discussed above. The user can then select some of those ascertained differences. Applying the manipulation operations associated with the user-selected differences to the first model will yield a target model that has been modified in the direction of the second model.

User selection of a set of basic model manipulation operations and application of the user-selected set of basic model manipulation operations to a model, e.g., to the first model (in a first iteration)/target model (in subsequent iterations) can be repeated. In other words, modification of the target model can be carried out iteratively. Thus, the merging of the two models need not be carried out in a single block. Instead, a user may selectively transition the target model block by block, e.g., from the form of the first model in the direction of the second model. During this transitioning, the user may be guided by the aforementioned graphical representation of the atomic and compound differences between the second model and the target model in its current form.

The set of manipulation operations selected by the user may contain manipulation operations that do not correspond to any of the original differences between the first and second models. Thus, this "manual" tweaking may alter the categorization of atomic and compound differences. Accordingly, the system may ascertain the atomic and compound differences between the second model and the modified model (every time) after a set of manipulations operations has been applied to the first model (in the first iteration)/target model (in subsequent iterations). The user interface may present these newly ascertained atomic and compound differences to the user as described above.

The system for merging process models may moreover include a data receiving subsystem that receives data representative of the first model and data representative of the second model. For example, the data receiving subsystem may receive the data representative of the first and second models and store this data in memory for processing by any of the subsystems described herein. The received data may include meta-data regarding the modeled process, e.g., explanations of individual process blocks and/or the advantages/disadvantages associated therewith. The disclosed processing of the models is to be understood as including processing of the respective representative data. The system thus provides for a transformation of at least some of the data representative of the first and second models to yield a meaningful result, namely a modified model. Any of the first model, the second model and the target model can model a respective process. As such, the system can yield a modified process model, which, at least in the case of a technical process, is a technically useful result. Moreover, the system itself is a technical construct.

Any of the first model, the second model and the target model can be in the form of a graph (e.g., data representative of a graph). In this case, the graph models a respective process in a given manner (i.e., in accordance with a predetermined modeling scheme). For example, the graph can include nodes and edges. The nodes may be representative of the various elements, e.g., operations and/or decisions that constitute the modeled process. The topology of the nodes and edges may reflect the structure of the process, e.g., be representative of temporal dependencies between the various elements constituting the process and/or of a flow of data between the various elements. Any of the nodes and edges may have attributes associated with the respective node/edge, e.g., attributes specifying the operation(s)/decision(s) associated with the respective node and representative of any parameters that are input to/output from/operated upon by the respective operation(s)/decision(s). Individual nodes of the graph can represent individual operations/decisions belonging to the process. Similarly, individual nodes of the graph can represent a set of operations/decisions belonging to the process. The type of representation is purely a matter of definition since what is to be considered a single action/decision or a set of actions/decisions is simply a question of the granularity of the model. As exemplified by the introductory example, getting into a car can be viewed as a single action or as a set of numerous actions and decisions. The individual edges can interconnect a respective pair of nodes and can thus represent dependencies between the operations/decisions associated with the respective, interconnected nodes. For example, a directed graph, i.e., a graph with "unidirectional" edges can be used to represent sequencing, i.e., temporal dependency, within the process.

The modeling scheme in accordance which with the graph represents the process can be associated with a predetermined plurality of basic model manipulation operations, i.e., operations that manipulate the graph and, thus, the process modeled by the graph. In the case of a graph, the plurality of basic model manipulation operations can include, but is not limited to, the addition/deletion of nodes/edges, connection/disconnection of a node and an edge, and modification of at least one attribute associated with a node or edge.

The system for merging process models may include a process validity enforcement information establishing subsystem that establishes process validity enforcement information with regard to at least some, alternatively all, of the basic model manipulation operations associated with the determined atomic differences and/or the determined compound differences. The process validity enforcement information may include information indicative of dependencies affiliated with and/or within the set of basic model manipulation operations associated with the atomic differences and/or compound differences, which dependencies are to be maintained in order for a modified model obtained by applying that set of basic model manipulation operations to a model to be valid, e.g., as valid as a reference model, e.g., as valid as the first model or the second model. Similarly, the process validity enforcement information may include information indicative of dependencies within the set of basic model manipulation operations associated with a single compound difference.

The system for merging process models may, on the basis of the process validity enforcement information, automatically effect model manipulation operations on the target model that restore validity subsequent to application of a set of user-selected model manipulation operations. The circumstances under which the system for merging process models may automatically effect model manipulation operations may be limited to a predetermined set of circumstances.

The term "validity" is used herein with regard to both models and processes. This variation in terminology is indicative of possible variation and is not intended to be limiting. In establishing the process validity enforcement information, the process validity enforcement information establishing subsystem may assess the validity of a model or of the actual process modeled by the model. Similarly the process validity enforcement information establishing subsystem may assess "validity" on the basis of both the model and the modeled process.

For example, presume that an atomic difference is the insertion of an element into a model, which element, in the modeled process, corresponds to an initialization procedure, e.g., the preheating of a processing oven to a predetermined temperature. If that element is not incorporated into the modified model, i.e., if that initialization procedure is not included in the resultant process, then any processing that relies on the oven being preheated cannot be guaranteed to yield the desired results. The resultant process is potentially invalid. Similarly, if that element were to be inserted into the modified model, yet at the wrong location, e.g., at the end of the process, then the process is again potentially invalid. In the above cases, knowledge of the actual process being modeled can be useful for establishing process validity enforcement information.

Presuming, as another example, that an atomic difference is the removal of an element that constitutes the sole connection between two otherwise separate parts of the model. In such a case, there is strong reason to presume, even without consideration of the actual modeled process, that removal of the element will yield an invalid model/process unless the separate parts of the model are reconnected by some other model manipulation operation. Thus, in such a case, knowledge of just the model can suffice for the corresponding establishing process validity enforcement information.

The above examples regarding the validity of atomic differences also apply to compound differences, albeit with the additional factor that compound differences include several atomic differences that might exhibit dependencies amongst themselves that are potentially relevant to the validity of a resultant process.

To establish the process validity enforcement information, the process validity enforcement information establishing subsystem may analyze at least one of: the structure, e.g., the topology, of the model, a data flow modeled by the model, and attributes associated with the elements of the model, etc. Similarly, the process validity enforcement information establishing subsystem may analyze the impact that changes to the model may have on the actual process modeled by the model.

Similarly, the process validity enforcement information may include information indicative of dependencies affiliated with and/or within the set of basic model manipulation operations associated with the atomic differences and/or the compound differences to be maintained in order for a modified model obtained by applying a set of basic model manipulation operations to a model to conform to a set of design constraints. In this respect, the system for merging process models may include a design constraint receiving subsystem that receives a set of design constraints, e.g., for storage in memory to serve as a basis for the processing as described herein. The design constraints may be constraints on the process model and/or on the modeled process. Such design constraints may be a maximum number of operations in a modeled process, a maximum temperature in an oven employed in the modeled process, etc.

The user interface may use the process validity enforcement information to inform a user of the validity of the target model. Similarly, the user interface may use the process validity enforcement information to indicate to a user whether application of a set of basic model manipulation operations to a model, e.g., to the first model (in a first iteration)/target model (in subsequent iterations), will yield a modified model of a valid process and/or indicate to the user potential invalidity that could arise in the corresponding, resultant process if a set of basic model manipulation operations is applied to a model. The user interface may output a warning to the user if application of the user-selected set of basic model manipulation operations to the first model (in a first iteration)/target model (in subsequent iterations) would yield a modified model that is in violation of the process validity enforcement information. As discussed above, a failure to conform to predetermined design constraints may likewise be considered "invalid," i.e., a violation of the process validity enforcement information.

While discussed hereinabove in the form of a system, embodiments may also be in the form of a method or computer program product, as will be appreciated by a person skilled in the art.

FIG. 1 shows an embodiment of a system 100 for merging process models. In the illustrated embodiment, system 100 includes an atomic differences determining subsystem 102, a compound differences determining subsystem 104, a model modification subsystem 106, a process validity enforcement information establishing subsystem 108, a data receiving subsystem 110, a design constraint receiving subsystem 112, a user interface 114, and a system memory 116. System 100 moreover includes a data bus (not shown) that provides for a communication of data between any of aforementioned subsystems 102-112, user interface 114 and system memory 116.

As described above, atomic differences determining subsystem 102 is configured to determine atomic differences in a second model that models a second process relative to a first model that models a first process. Data representing the first model and the second model that is processed by atomic differences determining subsystem 102 to determine the atomic differences may be obtained from system memory 116. Intermediate data generated by atomic differences determining subsystem 102 during determination of the atomic differences may be stored in system memory 116 or in local memory (not shown) within atomic differences determining subsystem 102. The same applies to data representative of the determined atomic differences generated by atomic differences determining subsystem 102.

As likewise described above, compound differences determining subsystem 104 is configured to determine compound differences in the second model relative to the first model. Compound differences determining subsystem 104 may obtain and operate on data representing the first model and the second model, e.g., from system memory 116. Compound differences determining subsystem 104 may equally obtain the aforementioned data representative of the determined atomic differences directly from atomic differences determining subsystem 102 or via system memory 116 and operate on this data representative of the determined atomic differences to determine the compound differences. Intermediate data generated by compound differences determining subsystem 104 during determination of the compound differences may be stored in system memory 116 or in local memory (not shown) within compound differences determining subsystem 104. The same applies to data representative of the determined compound differences generated by compound differences determining subsystem 104.

User interface 114 can carry out any of a variety of tasks, e.g., as described above. For example, user interface 114 may inform a user of the atomic differences and the compound differences. Similarly, user interface 114 may allow a user to select a set of basic model manipulation operations from a set of basic model manipulation operations associated with a reference modeling scheme. User interface 114 may also use process validity enforcement information to inform a user of the validity of a target model. Information provided by user interface 114 may be based on data obtained via system memory 116 or obtained directly from any of subsystems 102-112. Similarly, data representative of user input obtained by user interface 114 may be stored in system memory 116, stored in local memory (not shown) within user interface 114 and/or be communicated to any of subsystems 102-112. User interface 114 may include a display and an input device as known in the art.

Model modification subsystem 106 may obtain a modified model, e.g., the aforementioned target model, by applying a user-selected set of basic model manipulation operations to a model, e.g., to the first model. Model modification subsystem 106 may obtain data representative of the model from system memory 116 or data receiving subsystem 110. Similarly, model modification system 106 may obtain data representative of the user-selected set of basic model manipulation operations from system memory 116 and/or user interface 114. For example, data representative of available basic model manipulation operations may be stored in system memory 116 and data of representative of the user-selected set of manipulation operations may be stored in a local memory of user interface 114. Intermediate data generated by model modification subsystem 106 while obtaining the modified model may be stored in system memory 116 or in local memory (not shown) within model modification subsystem 106. The same applies to data representative of the modified model obtained by model modification subsystem 106.

Process validity enforcement information establishing subsystem 108 may, as described above, establish process validity enforcement information with regard to at least some, alternatively all, basic model manipulation operations associated with the atomic differences and/or compound differences determined by atomic/compound differences determining subsystem 102, 104. In this respect, process validity enforcement information establishing subsystem 108 may obtain data representative of the determined atomic/compounds differences either directly or via system memory 116 from atomic/compound differences determining subsystem 102, 104. The established process validity enforcement information can be communicated to user interface 114 to inform a user, in advance, of potential problems, i.e., invalidity, that could arise in the modeled process if particular basic model manipulation operations are applied to a model. Similarly, the established process validity enforcement information can be communicated to user interface 114 to inform a user, after-the-fact, of problems, i.e., invalidity, in a modeled process that have arisen as a result of application of particular basic model manipulation operations to the process model. In this respect, process validity enforcement information establishing subsystem 108 may obtain data representative of a modified model, i.e., representative of a model to which basic model manipulation operations have been applied, from model modification subsystem 106 either directly or via system memory 116. The "validity" of a model/process may be established, inter alia with regard to predetermined design constraints. In this respect, process validity enforcement information establishing subsystem 108 may obtain design constraint data from design constraint receiving subsystem 112 either directly or via system memory 116.

Data receiving subsystem 110 may receive data representative of the first model and or the second model, e.g., from a user via user interface 114 or from an external system via a data communication path (not shown). Data receiving subsystem 110 may store the received data in system memory 116 or in local memory (not shown) within data receiving subsystem 110. The data may, for example, be representative of a graph that models the respective process as described supra.

Design constraint receiving subsystem 112 may receive a set of design constraints, i.e., data representative of a set of design constraints, e.g., from a user via user interface 114 or from an external system via a data communication path (not shown). Design constraint receiving subsystem 112 may store the received data in system memory 116 or in local memory (not shown) within design constraint receiving subsystem 112. The design constraints may be constraints on the process model and/or on the modeled process. For example, a design constraint may be a prohibition of models having disjoint parts, a limitation of the number of operations in a modeled process, a limitation of the temperature in an oven employed in the modeled process, etc.

The various subsystems described above may be implemented by separate circuits, by circuits that share common circuitry, or by a correspondingly programmed general processor.

Figure 2A:
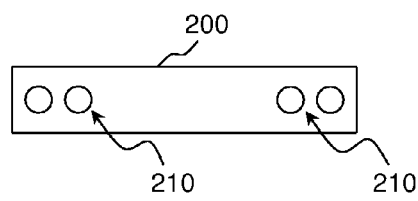
FIG. 2A shows a first connector.

FIG. 2A shows a first connector 200, namely a conventional connector as known in the art of woodworking. Connector 200 has a rectangular shape and is formed of metal. Connector 200 is provided with holes 210, e.g., for receiving screws that fasten connector 200 to the elements to be connected.

Figure 2B:
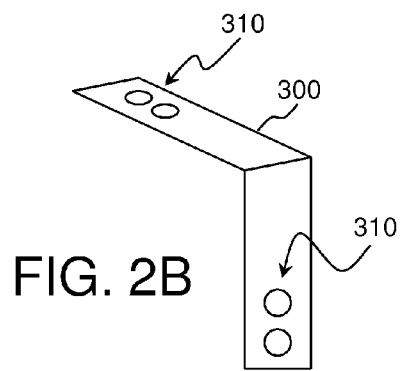
FIG. 2B shows a second connector.

FIG. 2B shows a second connector 300, namely a conventional angle connector as likewise known in the art of woodworking. Connector 300 is formed from a rectangular metallic strip that has been bent to form first and second portions. Each of the portions is provided with holes 310, e.g., for receiving screws that fasten connector 300 to the elements to be connected.

Figure 3A:
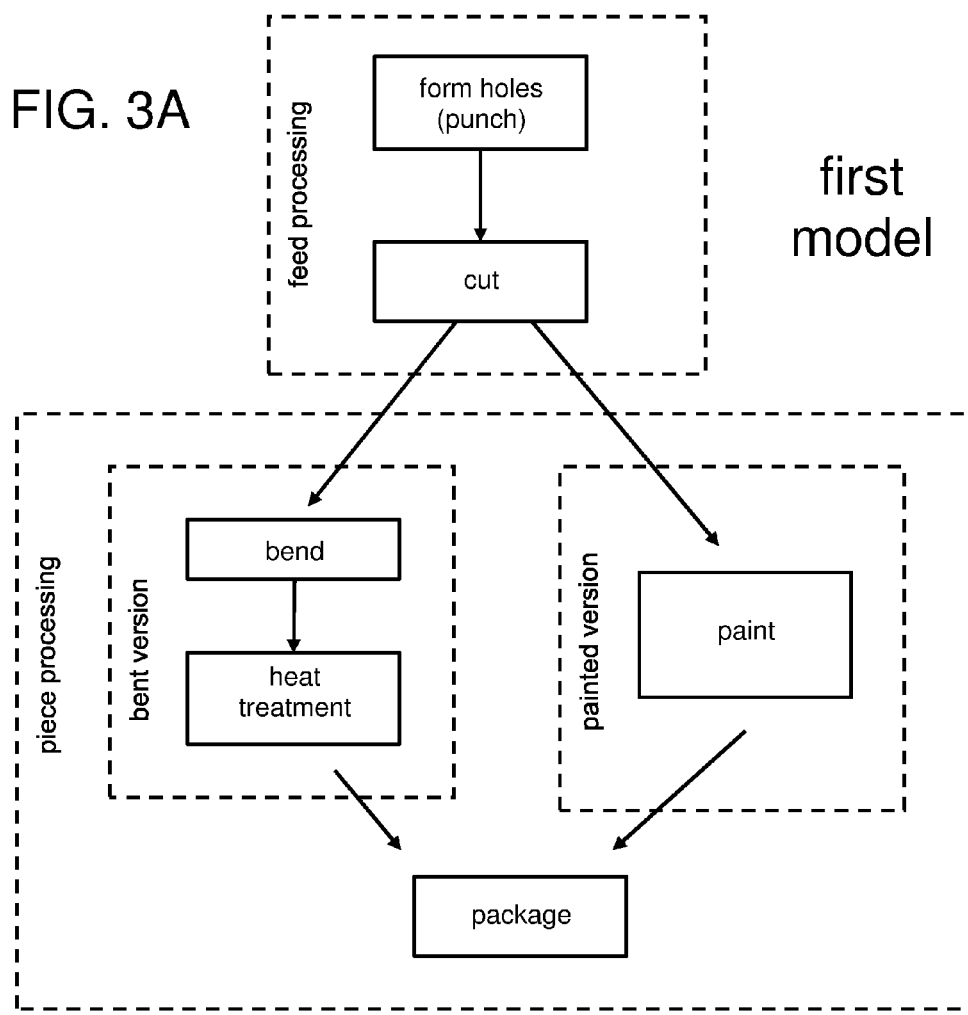
FIG. 3A shows a first process model.

FIG. 3A shows a first process model, i.e., a model of a first process, e.g., a hypothetical process for manufacturing a connector as shown in FIG. 2A or 2B. As reflected by the model, the hypothetical process includes a feed processing portion and a piece processing portion.

The feed processing portion includes two process blocks. In one block, holes are formed by punching holes at specified intervals into a continuous strip of metal. In another block, the continuous strip of metal is cut to form individual pieces. The process is modeled at a level of abstraction, i.e., at a granularity, at which many individual blocks such as the advancing of the strip of metal and the decision whether to produce a bent or a painted piece are not represented in a 1-to-1 fashion in the model.

The piece processing portion includes two alternative sub-processes, namely a sub-process for producing a bent version of the piece and a sub-process for producing a painted version of the piece. The piece processing portion furthermore includes a packaging block. The sub-process for producing a bent version of the piece is shown as comprising two process blocks, namely a block for bending the piece and a subsequent block for subjecting the bent piece to heat treatment for hardening the piece in its bent form. The sub-process for producing a painted version of the piece solely includes a block for painting the piece.

The first process model is in the form of a directed graph, the nodes reflecting process blocks, the edges reflecting the temporal relationship between the process blocks.

FIG. 3B shows a second process model, i.e., a model of a second process, e.g., a hypothetically improved process for manufacturing a connector as shown in FIG. 2B. As reflected by the model, the process again includes a feed processing portion and a piece processing portion.

In the feed processing portion of the hypothetical second process, the block for forming holes has been modified such that the holes are drilled rather than punched in the continuous strip of metal. In this hypothetical example, it could have been determined that drilling, although slower, produces less stress in the final piece. Moreover, a bending block has been inserted between the hole forming block and the cutting block. It could have been determined that bending the strip as it protrudes from the cutting machine is much more reliable if done before rather than after cutting, since the cut pieces tended to occasionally fall out of the machine during bending.

The piece processing portion again includes two alternative sub-processes as well as a packaging block. However, the sub-processes shown in FIG. 3A have been removed. Instead, the piece processing portion includes a sub-process for producing a "super painted" version of the piece and a sub-process for producing a galvanized version of the piece. The sub-process for producing a galvanized version of the piece solely includes a block for galvanizing the piece. It could have been determined that the paint tended to flake off painted pieces produced by the process of FIG. 2A. Galvanizing would protect the connector from rusting, but would not be prone to flaking. Thus galvanizing would provide low-cost rust protection. The sub-process for producing a "super painted" version of the piece is shown as including three process blocks, namely a first block for priming the piece, a second block for subjecting the primed piece to heat treatment and a third block for painting the piece. It could have been determined that the paint would not flake off as easily if a particular primer were applied and heat-fixed to the piece prior to painting. It could have been furthermore determined that the block for heat-fixing the primer to the piece could synergistically double as a heat treatment block for hardening the piece in its bent form. Text data describing such advantages could accompany the model, e.g., as metadata. Moreover, the model could be accompanied by design constraint data that specifies, e.g., that the primer must be heated to a particular temperature to ensure proper fixation to the piece and that the painting block may not be followed by a process block that would subject the piece to a temperature exceeding a predetermined temperature above which the paint would incur damage.

Computing Compound Operations and Dependencies Between Compound Operations

Figure 4:
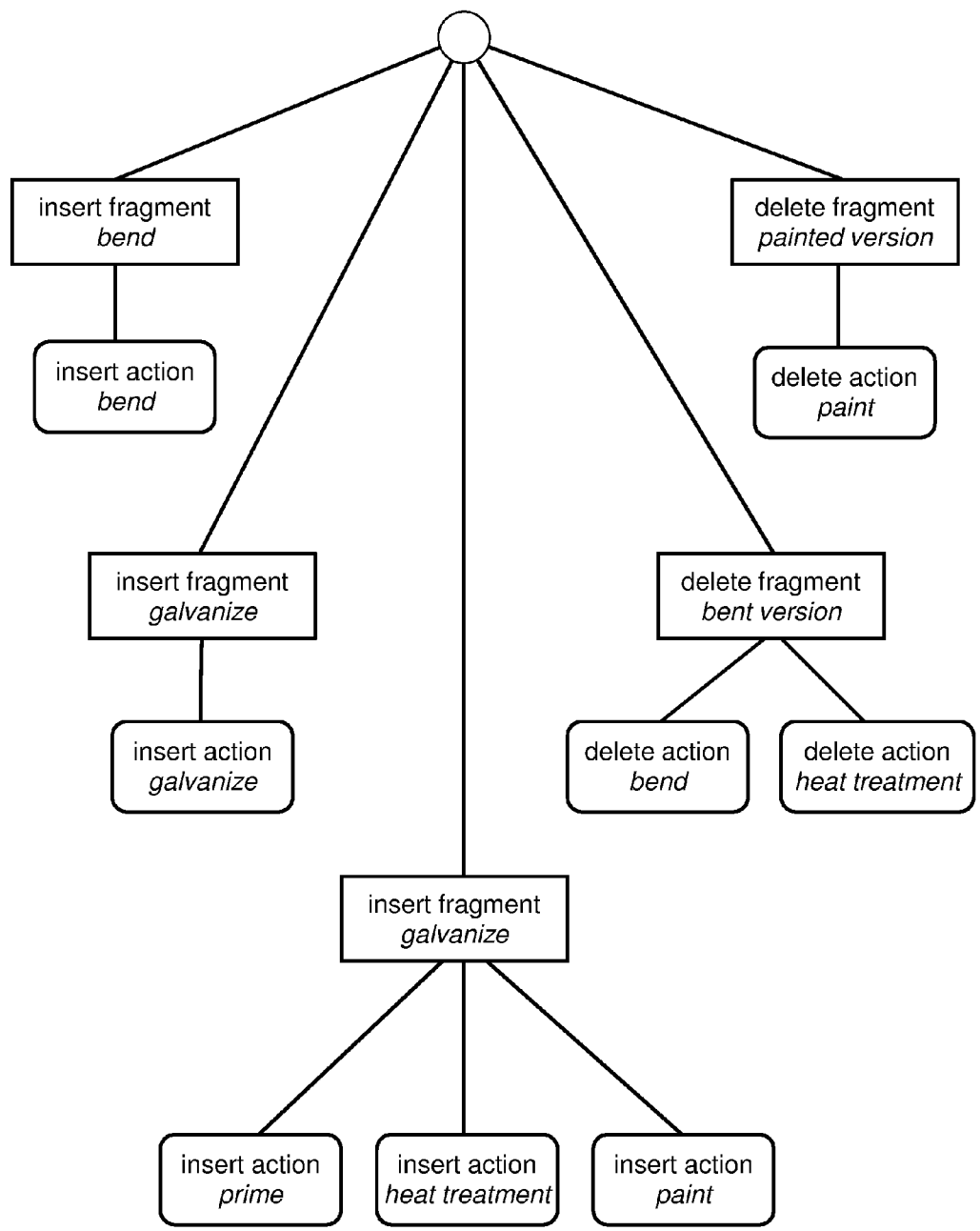
FIG. 4 shows a joint process structure tree based on compound differences between the first process model of FIG. 3A and the second process model of FIG. 3B in accordance with an embodiment.

FIG. 4 shows a joint process structure tree based on compound differences between the first process model of FIG. 3A and the second process model of FIG. 3B. In the following, FIG. 4 will be used to explain techniques for computing compound differences, i.e., compound operations, and dependencies between compound operations in accordance with embodiments.

Compound operations are change operations that combine several atomic operations. In a process model context, compound operations can be computed based on an underlying decomposition of the process models into fragments and their associated process structure trees. Instead of computing operations on the model element level, compound operations may be computed on an abstraction of the process models. One such possible abstraction is the process structure tree. Computing compound operations using process structure trees can be done as follows.

The two models, e.g., graphs or process structure trees (PST), modeling two respective processes are matched and corresponding elements are computed. This yields 1-to-1 correspondences, 0-to-1 and 1-to-0 correspondences. On the basis of these correspondences, compound operations are computed/identified, e.g., based on the definitions of compound operations as previously described. For example, each set of at least two atomic operations that forms a (contiguous) fragment within the model can be identified as a compound operation. Once computed/identified, the compound operations can be inserted into a so-called joint process structure tree (J-PST), which is a combination of the two process structure trees or a combination at least of differing fragments of the two process structure trees. A joint process structure tree captures the fragment hierarchy of the two process models.

After computing/identifying compound operations, dependencies between the compound operations can be computed as described herein. In general, a dependency between two operations means that the application of one operation requires the prior application of the other operation.

In the exemplary scenario, four different kinds of dependencies are identified that can occur between operations.

1) Insertion of an Action/Fragment into a newly inserted Fragment. Insertion of the Action/Fragment requires Insertion of the surrounding Fragment.

2) Movement of an Action/Fragment into a newly inserted Fragment. Movement of the Action/Fragment requires Insertion of the surrounding Fragment.

3) Deletion of an Action/Fragment within a deleted Fragment. Deletion of the surrounding Fragment requires Deletion of the Action/Fragment within the Fragment.

4) Movement of an Action/Fragment out of a deleted Fragment. Deletion of the surrounding Fragment requires Movement of the Action/Fragment within the Fragment.

Even more dependencies may exist between change operations than have been introduced here. For example, there is a dependency between the insertion of an element A between two directly connected nodes N and M (InsertAction(A,N,M)) and the insertion of an element B between A and M (InsertAction(B,A,M)). These fine-grained dependencies are based on the execution order of operations and can be computed on fully specified operations (i.e., all position parameters are given).

The dependencies introduced above can be computed on compound operations without position parameters, since they are based on the structural hierarchy of the process model and not on the execution order. In the following, these dependencies between operations will be designated as J-PST dependencies, in order to distinguish them from the fine-grained dependencies of an execution order.

The following Algorithm 1 computes dependencies based on the fragment hierarchy of the two process models that is captured in the Joint-PST.

Algorithm 1 (J-PST Dependency Computation):

```
determineDependenciesForCompoundOperationsBasedOnThePMG( ) {
  for (Fragment fragment : this) {
    for (Object node : fragment.getNodes( )) {
      PSTProcessMergingAnnotation anno =
          PST Adapter.getProcessMergingAnno((Node)node);
      for (CompoundOperation op : anno.getCompoundOperations( )) {
        // 1. insertion or movement into newly inserted fragment
        if (op instanceof InsertFragment
          || op instanceof InsertAction
          || op instanceof MoveFragment
          || op instanceof MoveAction) {
          markDependenciesForInsertOrMoveOperation(op);
        // 2. movement and deletion out of a fragment that has been
deleted
        } else if (op instanceof DeleteFragment) {
          markDependenciesForDeleteFragmentOperation(op);
        // 4. add dependencies due to ConvertFragmentOperations
        } else if (op instanceof ConvertFragment)
          markDependenciesForConvertFragmentOperation(op);
        }
        // 3. add dependencies due to implicit control actions
        dependenciesDueToImplicitControlActions(op);
      }
    }
  }
  computeTransitiveDependencies( );
}
```

In the example shown in FIGS. 3A, 3B and 4, the J-PST dependency algorithm computes the following dependencies as shown in FIG. 4. The three fragment insertion operations connected to the root node of the graph do not depend on any other operation and are directly applicable. In contrast, all of the action insertion operations depend on the respective fragment insertion operations. To give an example, application of the operation "insert action heat treatment" requires that the operation "insert fragment painted version" be applied before. Similarly, the three action deletion operations do not depend on any other operation and are directly applicable, whereas the two fragment deletion operations connected to the root node of the graph are dependent on the action deletion operations respectively associated therewith. To give an example, application of the operation "delete fragment bent version" requires that the operations "delete action bend" and "delete action heat treatment" be applied before.

Dependencies between compound operations need not be restricted to dependencies of the control flow as described in the previous paragraphs, but can also be derived from dependencies in the modeled data flow. If, for example, the painting block and the galvanizing block in the second model shown in FIG. 3B were to set a variable that specifies the type of packaging to be used in the packaging block, a failure to include the painting block in the merged model could render the resultant process invalid although there is no control flow dependency between the painting block and the packaging block. As such, enforcing observation of dependencies in the modeled data flow allows for better preservation of semantics when the models are merged. Data flow dependencies can be identified using CSSA-based data flow analysis.

Computing Atomic Operations

In the following, techniques for computing atomic differences, i.e., atomic operations, in accordance with embodiments will be described.

Computing atomic operations, technically, is essentially a discipline in model comparison and is described here primarily for the sake of completeness. Computing atomic operations is useful for applying a compound operation because the model manipulation may take place on the level of atomic operations.

Process models, e.g., business process models, may be stored in some kind of technical format, e.g., as an XML file. Descriptive metadata may be associated with/included in the model. For example, an XML may include an XSD Schema.

A comparison of two models may be broken into two phases: matching and differencing. The "matching" phase may browse the model, e.g., the XML tree, ascertaining the interconnections between respective elements, e.g., ascertaining which element comes from which other element. Available metadata can be leveraged during this phase. Second, in the differencing phase, the result from the matching phase may be browsed and applied to the other model. As a result, an atomic operation may be created for each element that does not match.

In a hybrid approach, an embodiment is based on both compound operations and atomic operations, it is useful to distinguish between two different kind of atomic operations, namely atomic attribute operations and atomic edge operations.

Atomic attribute operations can be seen as atomic operations that update/change/delete attributes of elements in the process model. These atomic operations can be computed using techniques such as EMF compare. These atomic operations can then be connected with a dependency link to the activity they belong to.

Atomic edge operations on the other hand cannot be computed as easily since these atomic operations are dependent on the compound operations selected/deselected for application. Techniques for computing atomic edge operations are described herein.

In one embodiment, atomic operations can be computed on demand for only a selected set of compound operations for the sake of saving execution time.

Computing Atomic Edge Operations and Analyzing Connections Between Compound Operations and Atomic Operations As described in the previous paragraphs, compound operations can describe a semantic change of a graphical model. As a user accepts an operation or a set of compound operations, it can be useful to analyze these compound operations to compute the set of atomic changes and apply them into the model. One part of the analysis may be based on the dependencies that have been computed for compound operations as previously described. Another part of the analysis may aim at computing those atomic operations that are needed for applying a compound operation, e.g., atomic edge operations that deal with the flow in the process model and atomic operations that deal with nodes (such as activities). These latter atomic operations are straightforward to compute and, for each compound operation, one can derive these based on the compound operation definition. For example, an "insert action" compound operation leads to an atomic insert node operation for that action. The atomic edge operations are more difficult to compute.

FIG. 5A shows a third process model. FIG. 5B shows a modification of the third process model of FIG. 5A. Techniques for ascertaining atomic edge operations will be described with reference to FIGS. 5A and 5B.

As an example, FIG. 5B shows a process model that has been modified vis-à-vis the process model shown in FIG. 5A via compound operations, namely insertion of nodes E and G. Depending on the set of operations a user accepts, a different set of atomic operations is computed to apply to the (target) model. If user just accepts the insertion of node E, the set of atomic operations required to retain validity of the model are:

> Insert node "E"
> Insert edge "B to E"
> Insert edge "E to C"
> Remove edge "B to C"

Notice that an additional edge is computed as one of the atomic operations required in order to preserve the connectedness of the resulting merged process. This computation may be carried out by process validity enforcement information establishing subsystem 108. The computed process validity enforcement information, namely the information that an additional edge is require to retain validity of the model, may be presented to the user. The system 100 for merging process models may be configured to automatically insert any edges required to retain validity/connectedness of a model after application of a selected set of model modification operations. Such configuration of the system 100 may be user-selectively activated/deactivated.

In contrast, if the user accepts the insertion of node E and G at the same time, the set of atomic operations required are as follows:

> Insert node "E"
> Insert node "G"
> Insert edge "B to E"
> Insert edge "E to G"
> Insert edge "G to E"
> Remove edge "B to C"

Operation analysis, i.e., assessment of process validity enforcement information, may take place when the user accepts any subset of compound operations. Process validity enforcement information establishing subsystem 108 may analyze the compound operations and compute the equivalent atomic operations. In essence, the analysis computes new connections required to make the graph connected if the set of operations are accepted. It also identifies the connections that should not be applied for this particular graph configuration. By applying these atomic operations to the model, the changes are integrated into the model and, most importantly, the connectedness of the graphical model is preserved.

In accordance with an embodiment, process validity enforcement information establishing subsystem 108 may perform operation analysis in a hybrid manner, based on atomic operations and compound operations. To extend operation analysis to a hybrid approach, the following blocks may be performed:

1. For each compound operation being applied, ensure its dependency compound operations, if any, are also applied. For example, if a node is inserted into a new fragment, to accept the insertion of the node, ensure that insertion of the fragment is accepted.

2. Compute the atomic node operations for each compound operation. For example, for an "insert fragment" operations, compute the atomic operations necessary to connect the fragment to the existing nodes of the model.

3. For each new node introduced by the compound operations being applied, determine its location within the graph model. First, determine the source of the new node. This can be achieved by traversing the incoming PST graph starting at the new node backward, and hitting the first node available in the merged graph model, i.e., the target model. To determine the target of the new node, traverse the incoming PST graph starting at the new node forward, and hit the first node in the merged model. Once the source and target are found, connect them with the new node. The same results can be achieved without a PST via corresponding analysis of the models to be merged.

4. For each deleted node, remove the node and connect its source to its target to completely connect the graph.

Using the previous example, if a user accepts the insertion of node E only, the following describes how the analysis could run.

1. Select the compound operation InsertAction(E) into the graph. As this operation has no dependency, no further action is needed.

2. For the InsertAction(E) compound operation, the Insert node E is the straightforward atomic node operation.

3. Determine the source. Starting from node E in the incoming PST, the analysis traverses the graph background and discovers node B. As node B is available in the merge model, i.e., the target model, node B is chosen to be the source. To determine the target, starting from node E again, the analysis traverses the graph forward and discovers node G. However, as node G is not in the merge model, the analysis continues the traversal and discovers node C. C is found in the merged model and thus is chosen to be the target. As source and target are discovered, it is thus determined to connect node E to node B and node E to node C to make the merged model connected.

4. Since there is no deleted node, no action is required.

Compute Dependencies/Prerequisites and Conflicts in Compound Operations

As discussed in the previous section, compound operations may also necessitate edge operations to maintain the validity of a graph. As such, accepting or rejecting the compound operation can potentially necessitate the addition or deletion of additional edges. If the graph being merged restricts source and target nodes to having a single outgoing or incoming edge, respectively, additional constraints are put in place to prevent corruption of the merged model, i.e., the target model.

In the case of a 3-way comparison, where two users are making changes to the same model, cases can arise where two edge operations generate links that use the same target or source connection point. If only one link, i.e., edge, can be connected to the point, i.e., node, a conflict relationship is created. A conflict ensures that the operations are mutually exclusive allowing at most one operation to be applied.

Unlike conflicts, there are cases where operations are applied (or rejected) together. Assume the user removes a fragment from the graph, and in its place adds another one. This will result in two compound operations: delete and add fragment. As described in the previous section, when a compound operation is applied (or rejected) links may be dynamically generated (or deleted). In this case, the user cannot reject the delete operation and accept the add since the resulting changes both use the same connection points in the graph. To prevent such behavior, relationships can be established between the operations that ensure correct behavior.

The behavior is enforced by establishing additional prerequisite and dependency relationships between operations, i.e., further process validity enforcement information. This information may be established by the process validity enforcement information establishing subsystem 108. The system 100 may be configured to enforce a dependency relationship when a delta, i.e., a set of model manipulation operations, is rejected. For example, all dependencies may be rejected prior to the subject delta being rejected. Similarly, the system 100 may be configured to enforce a prerequisite relationship when a delta is accepted. For example, all prerequisite deltas may be accepted before the subject delta is accepted.

An exemplary algorithm (used, e.g., by the process validity enforcement information establishing subsystem 108) for establishing these relationships first collects the following information for each operation:
1. Source connection points for add operations.
2. Source connection points for delete operations.
3. Target connection points for add operations.
4. Target connection points for delete operations.

Lists 1 and 2 are compared, as are lists 3 and 4. For every entry in lists 1 and 3 that exists in 2 and 4, respectively, the following relationship is created:
A. 1 and 3 prerequisite 2 and 4, respectively.
B. 2 and 4 depend on 1 and 3, respectively.

In other words, prerequisite relationship A stipulates that if an add operation is accepted, all delete operations that share the same connection point will be also accepted to prevent the collision. Likewise, dependency relationship B stipulates that if a delete operation is rejected, all add operations that share the same connection point will be also rejected to prevent the collision. This approach will be further elucidated with reference to FIGS. 6A to 6C.

A user replaces one node (B) in an original graph with another node (D) to produce an updated graph as illustrated in FIGS. 6A and 6B. The operations arising from the comparison describe the deletion of B and the addition of D. As shown in FIG. 6C, there are corresponding edge operations that connect each node to the rest of the graph. Assuming nodes A and C can only have a single outgoing and incoming link, respectively, based on the algorithm described above the delete and add operations are related to each other as follows:
operation 1 (delete B) depends on operation 2 (add D)
operation 2 (add D) prerequisites operation 1 (delete B)

So, if operation 1 is rejected (meaning that B is added back into the graph) rejection of operation 2 may be enforced on account of the dependency relationship, since B cannot be added back if D is in place.

Likewise, if operation 2 is accepted, then acceptance of operation 1 may be enforced on account of the prerequisite relationship, to ensure that B is removed before D is added.

Notice that the differentiation of the two types of relationships used provides the user with flexibility in how to apply the operations. The relationships help ensure that if operation 1 is rejected, operation 2 is also rejected, and that if operation 2 is accepted, operation 1 is also accepted.

However, the system 100 is configured such that the aforementioned relationships need not mandate rigorous enforcement, but rather ensure that the user is informed of possible validity violations, e.g., when elements are added to/deleted from the target model. For example, the system 100 may allow an informed user to nonetheless choose to accept operation 1 and to reject operation 2, thus leaving a gap in the graph.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for merging process models to modify physical processes modeled by the process models, comprising:

receiving data representative of a first model that models a first process and a second model that models a second process;

determining, based on the data and a predetermined plurality of basic model manipulation operations, atomic differences in the second model relative to the first model, wherein each of the atomic differences is associated with a respective one of the plurality of basic model manipulation operations;

determining compound differences in the second model relative to the first model, wherein each of the compound differences is associated with at least two of the plurality of basic model manipulation operations that form a contiguous fragment in the second model such that a sum of the first model, the atomic differences and the compound differences corresponds to the second model;

informing a user of the atomic differences and the compound differences;

receiving a user selection identifying a set of the plurality of basic model manipulation operations;

identifying a set of atomic operations and a set of compound operations based at least in part on the selected set of the plurality of basic model manipulation operations, the set of compound operations being associated with a subset of the compound differences and including a first compound operation;

deriving a plurality of atomic attribute operations associated with a definition of each of the compound operations and adding one or more atomic edge operations to retain connectedness after application of the selected set of the plurality of basic model manipulation operations to the first model;

validating the selected set of the plurality of basic model manipulation operations by:
  determining that the one or more atomic edge operations include a first atomic edge operation that adds a link between a first fragment and a first connection point of the first model, the first compound operation including the first atomic edge operation;
  determining that a second compound operation is a prerequisite to the first compound operation by determining that the second compound operation includes a second atomic edge operation that deletes an existing link between a second fragment and the first connection point;
  determining that the set of compound operations does not include the second compound operation;
  adding the second compound operation to the set of compound operations;
  accepting the second compound operation in response to acceptance of the first compound operation based on the prerequisite relationship between the first compound operation and second compound operation;
  determining that the set of compound operations includes a third compound operation that deletes the link between the first fragment and the first connection point and a fourth compound operation that adds a link between a third fragment and the first connection point, wherein the third compound operation is dependent on the fourth compound operation;
rejecting the third compound operation; and
rejecting the fourth compound operation based at least in part on the dependency of the third compound operation on the fourth compound operation;
obtaining a modified first model by applying the set of atomic operations and the set of compound operations to the first model, wherein applying the set of compound operations comprises applying the plurality of atomic attribute operations, the one or more atomic edge operations, and the second atomic edge operation;
determining that a second user is requesting one or more changes to the first model or the second model that would cause an additional link to the first connection point;
creating a conflict relationship based on determining that only one link can be connected to the first connection point; rejecting, based at least in part on the conflict relationship, the one or more changes requested by the second user to prevent generating the additional link to the first connection point; and
outputting the modified first model to enable insertion, deletion, or modification of a process step of a physical process performed by a machine to obtain a modified physical process, wherein the physical process is modeled by the first model.

2. The method of claim 1, further comprising:
providing a user interface to break up one or more of the compound differences into two or more of the atomic differences in the modified first model;
determining whether a set of manipulation operations selected by the user includes one or more manipulation operations that does not correspond to any original differences between the first model and the second model in the modified first model;
ascertaining the atomic and compound differences between the second model and the modified first model after the set of manipulation operations has been applied; and
establishing, based on the data, process validity enforcement information with regard to at least one basic model manipulation operation associated with at least one of the atomic differences and the compound differences.

3. The method of claim 2, further comprising:
informing the user of a validity of the modified first model based on the process validity enforcement information.

4. The method of claim 2, wherein the process validity enforcement information comprises information indicative of dependencies within a set of the basic model manipulation operations associated with at least one of the atomic differences and the compound differences to be maintained in order for a model obtained by applying the set of basic model manipulation operations to the first model to be as valid as the first model.

5. The method of claim 2, further comprising:
receiving a set of design constraints that constrain an order of process blocks based on actions modeled by the process blocks, wherein the process validity enforcement information comprises information indicative of dependencies within a set of the basic model manipulation operations associated with at least one of the atomic differences and the compound differences to be maintained in order for a model obtained by applying the set of basic model manipulation operations to the first model to conform to the set of design constraints.

6. The method of claim 2, further comprising:
outputting a warning to the user if application of the selected set of basic model manipulation operations to the first model would yield a modified model that is in violation of the process validity enforcement information.

7. The method of claim 1, wherein obtaining the modified first model is based on determining add and delete operations associated with one or more compound operations, comparing lists of each add and delete operation to create prerequisite and dependency relationships between the add and delete operations, and using the relationships to accept or reject each of the add and delete operations.

8. The method of claim 1, further comprising:
informing the second user of the conflict relationship; and
providing the second user with a capability to override the rejecting and cause the one or more changes to the first model or the second model that would cause the additional link to the first connection point to be implemented.

9. A system for merging process models to modify physical processes modeled by the process models, comprising:
a data receiving subsystem configured to receive data representative of a first model that models a first process and a second model that models a second process;
an atomic differences determining subsystem configured to determine, based on the data and a predetermined plurality of basic model manipulation operations, atomic differences in the second model relative to the first model, wherein each of the atomic differences is associated with a respective one of the plurality of basic model manipulation operations;
a compound differences determining subsystem configured to determine compound differences in the second model relative to the first model, wherein each of the compound differences is associated with at least two of the plurality of basic model manipulation operations that form a contiguous fragment in the second model such that a sum of the first model, the atomic differences and the compound differences corresponds to the second model;
a user interface configured to inform a user of the atomic differences and the compound differences, the user interface receiving a user selection identifying a set of the plurality of basic model manipulation operations, wherein, based at least in part on the selected set of the plurality of basic model manipulation operations, a set of atomic operations and a set of compound operations are identified, the set of compound operations being associated with a subset of the compound differences and including a first compound operation, and wherein a plurality of atomic attribute operations associated with a definition of each of the compound operations is derived and one or more atomic edge operations are added to retain connectedness after application of the selected set of the plurality of basic model manipulation operations to the first model; and
a model modification subsystem configured to validate the selected set of the plurality of basic model manipulation operations by:
determining that the one or more atomic edge operations include a first atomic edge operation that adds a link between a first fragment and a first connection point of the first model, the first compound operation including the first atomic edge operation;
determining that a second compound operation is a prerequisite to the first compound operation by determining that the second compound operation includes a second atomic edge operation that deletes an existing link between a second fragment and the first connection point;
determining that the set of compound operations does not include the second compound operation;
adding the second compound operation to the set of compound operations;
accepting the second compound operation in response to acceptance of the first compound operation based on the prerequisite relationship between the first compound operation and second compound operation;
determining that the set of compound operations includes a third compound operation that deletes the link between the first fragment and the first connection point and a fourth compound operation that adds a link between a third fragment and the first connection point, wherein the third compound operation is dependent on the fourth compound operation;
rejecting the third compound operation; and
rejecting the fourth compound operation based at least in part on the dependency of the third compound operation on the fourth compound operation,
wherein the model modification subsystem is further configured to:
obtain a modified first model by applying the set of atomic operations and the set of compound operations to the first model, wherein applying the set of compound operations comprises applying the plurality of atomic attribute operations, the one or more atomic edge operations, and the second atomic edge operation;
determine that a second user is requesting one or more changes to the first model or the second model that would cause an additional link to the first connection point;
create a conflict relationship based on determining that only one link can be connected to the first connection point; and
reject, based at least in part on the conflict relationship, the one or more changes requested by the second user to prevent generating the additional link to the first connection point; and
outputting the modified first model to enable insertion, deletion, or modification of a process step of a physical process performed by a machine to obtain a modified physical process, wherein the physical process is modeled by the first model.

10. The system of claim 9, wherein the user interface is further configured to break up one or more of the compound differences into two or more of the atomic differences in the modified first model based on one or more manipulation operations, and the system is further configured to determine whether a set of manipulation operations selected by the user includes one or more manipulation operations that does not correspond to any original differences between the first model and the second model in the modified first model, and to ascertain the atomic and compound differences between the second model and the modified first model after the set of manipulation operations has been applied, and further comprising:

a process validity enforcement information establishing subsystem configured to establish, based on the data, process validity enforcement information with regard to at least one basic model manipulation operation with at least one of the atomic differences and the compound differences.

11. The system of claim 10, wherein the user interface is further configured to inform the user of a validity of the modified first model based on the process validity enforcement information.

12. The system of claim 10, wherein the process validity enforcement information comprises information indicative of dependencies within a set of the basic model manipulation operations associated with at least one of the atomic differences and the compound differences to be maintained in order for a modified model obtained by applying the set of basic model manipulation operations to the first model to be as valid as the first model.

13. The system of claim 10, further comprising:
a design constraint receiving subsystem configured to receive a set of design constraints that constrain an order of process blocks based on actions modeled by the process blocks, wherein the process validity enforcement information comprises information indicative of dependencies within a set of the basic model manipulation operations associated with at least one of the atomic differences and the compound differences to be maintained in order for a model obtained by applying the set of basic model manipulation operations to the first model to conform to the set of design constraints.

14. The system of claim 10, wherein the user interface outputs a warning to the user if application of the selected set of basic model manipulation operations to the first model would yield a modified model that is in violation of the process validity enforcement information.

15. The system of claim 9, wherein the modified first model is obtained based on determining add and delete operations associated with one or more compound operations, comparing lists of each add and delete operation to create prerequisite and dependency relationships between the add and delete operations, and using the relationships to accept or reject each of the add and delete operations.

16. A computer program product for merging process models to modify physical processes modeled by the process models, the computer program product comprising:
a tangible non-transitory computer readable storage medium having computer readable code embodied therewith, the computer readable program code comprising:
computer readable program code configured for:
receiving data representative of a first model that models a first process and a second model that models a second process;
determining, based on the data and a predetermined plurality of basic model manipulation operations, atomic differences in the second model relative to the first model, wherein each of the atomic differences is associated with a respective one of the plurality of basic model manipulation operations;
determining compound differences in the second model relative to the first model, wherein each of the compound differences is associated with at least two of the plurality of basic model manipulation operations that form a contiguous fragment in the second model such that a sum of the first model, the atomic differences and the compound differences corresponds to the second model;

informing a user of the atomic differences and the compound differences;

receiving a user selection identifying a set of the plurality of basic model manipulation operations;

validating the selected set of the plurality of basic model manipulation operations by:

identifying a set of atomic operations and a set of compound operations based at least in part on the selected set of the plurality of basic model manipulation operations, the set of compound operations being associated with a subset of the compound differences and including a first compound operation;

deriving a plurality of atomic attribute operations associated with a definition of each of the compound operations and adding one or more atomic edge operations to retain connectedness after application of the selected set of the plurality of basic model manipulation operations to the first model, the one or more atomic edge operations including a first atomic edge operation that adds a link between a first fragment and a first connection point of the first model, the first compound operation including the first atomic edge operation;

determining that a second compound operation is a prerequisite to the first compound operation by determining that the second compound operation includes a second atomic edge operation that deletes an existing link between a second fragment and the first connection point;

determining that the set of compound operations does not include the second compound operation;

adding the second compound operation to the set of compound operations;

accepting the second compound operation in response to acceptance of the first compound operation based on the prerequisite relationship between the first compound operation and second compound operation;

determining that the set of compound operations includes a third compound operation that deletes the link between the first fragment and the first connection point and a fourth compound operation that adds a link between a third fragment and the first connection point, wherein the third compound operation is dependent on the fourth compound operation;

rejecting the third compound operation; and rejecting the fourth compound operation based at least in part on the dependency of the third compound operation on the fourth compound operation;

obtaining a modified first model by applying the set of atomic operations and the set of compound operations to the first model, wherein applying the set of compound operations comprises applying the plurality of atomic attribute operations, the one or more atomic edge operations, and the second atomic edge operation;

determining that a second user is requesting one or more changes to the first model or the second model that would cause an additional link to the first connection point;

creating a conflict relationship based on determining that only one link can be connected to the first connection point;

rejecting, based at least in part on the conflict relationship, the one or more changes requested by the second user to prevent generating the additional link to the first connection point; and outputting the modified first model to enable insertion, deletion, or modification of a process step of a physical process performed by a machine to obtain a modified physical process, wherein the physical process is modeled by the first model.

17. The computer program product of claim 16, further comprising:

providing a user interface to break up one or more of the compound differences into two or more of the atomic differences in the modified first model;

determining whether a set of manipulation operations selected by the user includes one or more manipulation operations that does not correspond to any original differences between the first model and the second model in the modified first model;

ascertaining the atomic and compound differences between the second model and the modified first model after the set of manipulation operations has been applied; and establishing, based on the data, process validity enforcement information with regard to at least one basic model manipulation operation associated with at least one of the atomic differences and the compound differences.

18. The computer program product of claim 16, wherein obtaining the modified first model is based on determining add and delete operations associated with one or more compound operations, comparing lists of each add and delete operation to create prerequisite and dependency relationships between the add and delete operations, and using the relationships to accept or reject each of the add and delete operations.

19. The computer program product according to claim 17, wherein the process validity enforcement information comprises information indicative of dependencies within a set of the basic model manipulation operations associated with at least one of the atomic differences and the compound differences to be maintained in order for a model obtained by applying the set of basic model manipulation operations to the first model to be as valid as the first model.

20. The computer program product of claim 17, further comprising:

receiving a set of design constraints that constrain an order of process blocks based on actions modeled by the process blocks, wherein the process validity enforcement information comprises information indicative of dependencies within a set of the basic model manipulation operations associated with at least one of the atomic differences and the compound differences to be maintained in order for a model obtained by applying the set of basic model manipulation operations to the first model to conform to the set of design constraints.

* * * * *